US006785663B2

United States Patent
Wang et al.

(10) Patent No.: US 6,785,663 B2
(45) Date of Patent: Aug. 31, 2004

(54) SYSTEM AND METHOD FOR META-PATTERN DISCOVERY

(75) Inventors: Wei Wang, White Plains, NY (US); Jiong Yang, White Plains, NY (US); Philip Shi-Lung Yu, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 533 days.

(21) Appl. No.: 09/752,620

(22) Filed: Dec. 28, 2000

(65) Prior Publication Data

US 2002/0087495 A1 Jul. 4, 2002

(51) Int. Cl.$^7$ ................................................. G06N 5/02
(52) U.S. Cl. ........................................ 706/45; 382/229
(58) Field of Search ............................ 706/45; 382/229

(56) References Cited

U.S. PATENT DOCUMENTS 6,333,999 B1 * 12/2001 Brownsmith ................ 382/229

OTHER PUBLICATIONS

Han, Jiawei et al, DBMiner: A System for Data Mining in Relational Databases and Data Warehouses, Proceedings of the 1997 conference of the Centre for Advanced Studies on Collaborative research, Nov. 1997, pp. 1–12.*

Yang, Jiong, Infominer: mining surprising periodic patterns, Proceedings of the seventh ACM SIGKDD international conference on Knowledge discovery and data mining, Aug. 2001, pp. 395–400.*

J. Han et al., "Efficient Mining of Partial Periodic Patterns in Time Series Database," Proceedings of 15th International Conference on Data Engineering, pp. 106–115, Mar. 1999.

R. Agrawal et al., "Mining Sequential Patterns," Proceedings of 11th International Conference on Data Engineering, pp. 3–14, Mar. 1995.

U.S. patent application Ser. No. 09/585,757, W. Wang et al., "Methods for Identifying Partial Periodic Patterns and Corresponding Event Subsequences in an Event Sequence", filed Jun. 2, 2000,

* cited by examiner

Primary Examiner—Wilbert L. Starks, Jr.
(74) Attorney, Agent, or Firm—Rafael Perez-Pineiro; Ryan, Mason & Lewis, LLP

(57) ABSTRACT

Periodic patterns in time series data can be hierarchical in nature, where a higher level pattern may comprise repetitions of lower level patterns. In the presence of noises, these repetitions of lower level patterns may not be perfect. A novel model, namely a meta-pattern, is provided in accordance with the present invention to capture these higher level patterns. The meta-pattern can not only provide a more compact representation of patterns but also capture the regularities of pattern evolutions, which may not be expressed by previous models due to the presence of noise. A method is provided to mine meta-patterns in an iterative manner by discovering meta-patterns and their supporting subsequences in the form of lists of segments of contiguous repetitions of a meta-pattern. The number of pattern repetitions in each said segment is at least a predefined threshold min_rep and the distance between any two adjacent segments is at most a predefined threshold max_dis.

40 Claims, 12 Drawing Sheets

SYSTEM AND METHOD FOR META-PATTERN DISCOVERY

CROSS REFERENCE TO RELATED APPLICATIONS

This application is related to the U.S. patent application identified by Ser. No. 09/585,757, filed on Jun. 2, 2000, and entitled "Methods for Identifying Partial Periodic Patterns and Corresponding Event Subsequences in an Event Sequence."

FIELD OF THE INVENTION

The present invention generally relates to data mining and, more particularly, to identifying partial periodic patterns in an event sequence, wherein patterns that are hierarchical in nature can be represented in the form of a meta-pattern.

BACKGROUND OF THE INVENTION

Periodicy detection on time series data is a challenging problem of great importance in many real applications. The periodicy is usually represented as repeated occurrences of a list of events in a certain order at some frequency. Due to the changes of system behavior, some pattern may be only notable within a portion of the entire data sequence and different patterns may present themselves at different places. The evolution among patterns may also follow some regularity. Such regularity, if any, would be of great value in understanding the nature of the system that generated such events and building a prediction model. Consider the application of an Internet user profile. The sequence of web pages that a user accesses is often used to construct the user profile. An accurate profile is significant in many application domains including a personalization and recommendation system. During a period of time, a user may access some web sites repetitively. Such behavior may be represented by a periodic pattern that can be put into a user's profile. Moreover, a user's Internet access pattern may change over time. For instance, during a normal business day, one may surf financial web sites mostly when the stock market is open and may switch to sports oriented web sites for the rest of the day. At a coarser level, we may also find that such pattern holds during weekdays whereas a totally different pattern presents itself during weekends.

However, most previous research in this area has focused on mining patterns that only take basic events as their components and may not always recognize the above higher level pattern due to the presence of random noise. In general, some tolerable noise is usually allowed within a series of pattern repetitions to accommodate a certain degree of imperfection. As a result, two portions (of a data sequence) where a pattern is notable may have a different layout of pattern occurrences. There may not exist any common representation in terms of raw events. For example, two patterns (a, b, *) and (b, c) alternately appear in the sequence shown in FIG. 1. Here, a pattern may be only partially filled and "*" is used to substitute the "don't care" position(s). The length of each portion where (a, b, *) is notable is 19 and each portion where (b, c) is notable contains 6 symbols. In addition, each gap between notable portions of (a, b, *) and (b, c) consists of 2 positions while a three-position gap presents itself after each notable portion of (b, c). All of these can be represented by a higher level pattern of four components ((a, b, *):[1,19], *:[20,21], (b, c):[22,27], *:[28, 30]). The numbers in the brackets indicate the offset of the component within the pattern. Let's take a closer look at those two portions where the pattern (a, b, *) is notable: one is from position 1 to 19 and the other is from position 31 to 49. Note that both portions contain some noise that impairs the perfection on repetition of (a, b, *). Neither of them can match a single basic pattern format (i.e., (a, b, *, a, b, *, a, b, *, a, b, *, a, b, *, a, b, *)). Since the locations and durations of the noise are different in these two portions, (a, b, *, a, b, *, a, b, *, *, *, *, *, *, a, b, *, a, b, *) and (a, b, *, a, b, *, *, a, b, *, a, b, *, a, b, *) do not match with each other. In general, the noise could occur anywhere, be of various duration, and even occur multiple times within the portion where a pattern is notable as long as the noise is below some threshold. Even though the allowance of noise plays a positive role in characterizing system behavior in a noisy environment, it prevents such a higher level pattern from being represented in the form of an equivalent basic pattern.

SUMMARY OF THE INVENTION

The present invention addresses the above and other issues by providing pattern mining methods and systems that employ a "meta-pattern" model which provides a more powerful mechanism for periodicy representation. In contrast to existing periodicy models, each component of a meta-pattern according to the invention is allowed to be either a simple event or a pattern (or lower level meta-pattern). We refer to those patterns that only contain simple events as their components as "basic patterns."

It is to be appreciated that the recursive nature of a meta-pattern according to the invention not only can provide a more compact representation of complicated patterns but also can capture the regularities of pattern evolutions, which may not be expressible by existing models. In order to accommodate a certain degree of noise, a meta-pattern is said to be "valid" in a symbol sequence if there exists, in the symbol sequence, a list of segments of perfect repetitions of the meta-pattern where the number of repetitions in each segment is at least a prespecified threshold (min_rep) and the distance between any two consecutive segments is at most a prespecified threshold (max_dis).

However, the flexibility of a meta-pattern may pose challenges in the discovery process, which may not be encountered in mining basic patterns, for instance:

(i) While a basic pattern has two degrees of freedom: the period (i.e., the number of components in the pattern) and the choice of symbol/event for each component, a meta-pattern has an additional degree of freedom: the length of each component in the pattern. It is incurred by the fact that a component may occupy multiple positions. This extra degree of freedom would increase the number of potential meta-pattern candidates dramatically.

(ii) Many patterns/meta-patterns may collocate or overlap for any given portion of a sequence. For example, both of (a, b, a, *) and (a, *) are valid within the sequence a b a c a b a b a b a a a d a d a b a d a c a d b b a d. As a result, during the meta-pattern mining process, there could be a large number of candidates for each component of a higher level meta-pattern. This also aggravates the mining complexities.

Therefore, how to identify the "proper" candidate meta-patterns becomes very crucial to the overall efficiency of the mining process. To address this issue, the present invention employs a "component property," in addition to the traditionally used "a priori property," to prune the search space. This is inspired by the observation that a pattern may participate in a meta-pattern only if its notable portions exhibit a certain cyclic behavior. Thus, in accordance with the invention, a "segment-based" algorithm is provided to identify the potential period of a meta-pattern and, for each component of a possible period, the potential pattern candidate(s) and its length within the meta-pattern. The set of all meta-patterns can be categorized according to their structures and are evaluated in a designed order so that the pruning power provided by both properties can be fully utilized.

Accordingly, as will be explained in further detail below, the present invention provides the following advantageous features that serve to greatly improve pattern discovery in time series data such as event data:

(i) A meta-pattern model to capture the cyclic relationship among discovered periodic patterns and to enable a recursive construction of exhibited cyclic regularities.

(ii) A component property to provide further pruning power, in addition to the traditional a priori property.

(iii) A segment-based algorithm to identify potential meta-pattern candidates.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

The present invention will be described below in the context of an exemplary event data mining application domain. However, it is to be understood that the invention is not limited to use with any particular application domain but is rather more generally applicable for use in accordance with any time series data mining application domain in which it is desirable to provide improved periodicity detection and representation with respect to the time series data. Also, it is to be appreciated that the time series data may take on a large variety of forms, none of which are intended to limit the invention. Thus, a data symbol may represent any form of data, e.g., numbers, letters, characters, etc. Given the inventive teachings herein, one of ordinary skill in the art will realize a large variety of time series data applications for employing the methodologies of the invention.

Figure 1:
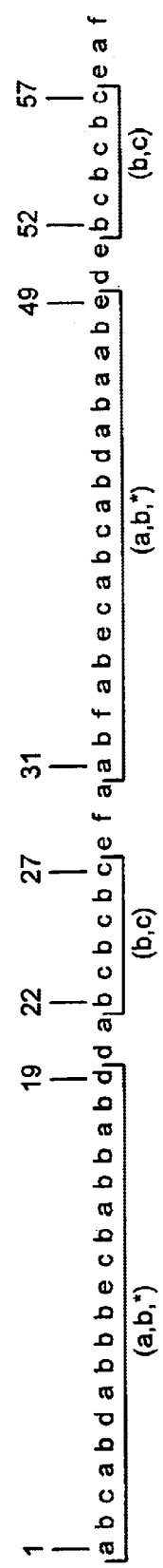
FIG. 1 is a diagram illustrating an exemplary event sequence.
Figure 2:
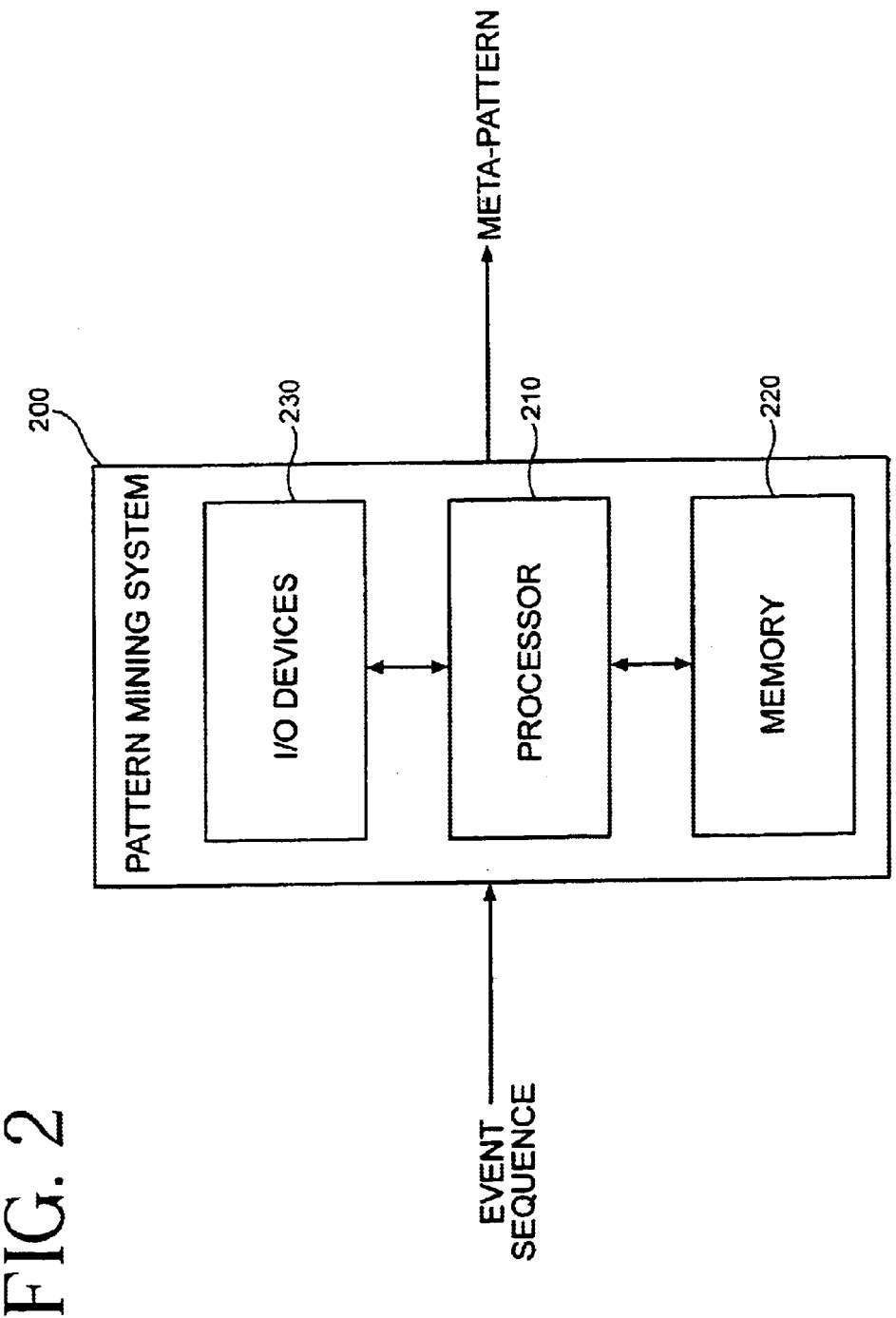
FIG. 2 is a block diagram illustrating a generalized hardware architecture of a computer system suitable for implementing a system for discovering meta-patterns according to the present invention.

Referring initially to FIG. 2, a block diagram illustrates a generalized hardware architecture of a computer system suitable for implementing a system for discovering meta-patterns according to the present invention. As illustrated, an exemplary system 200 comprises a computer system which receives, as input, one or more event sequences. It is to be understood that the one or more sequences of events may be generated by one or more application-specific systems that are being managed, e.g., a plurality of computing devices coupled via a communication network, or some other application domain such as, for example, process control, manufacturing, etc. If the pattern mining system 200 is collocated with the application-specific system, the pattern mining system may receive the event data directly from the application-specific system. If the pattern mining system is located remotely with respect to the application-specific system, the pattern mining system may receive the event data over a network. It is to be appreciated that the network may be a public information network such as, for example, the Internet or world wide web, however, the systems may alternatively be connected via a private network, a local area network, or some other suitable network. Event data may also be entered directly into the pattern mining system 200 by an operator. In a client/server architecture, the pattern mining system 200 may operate as a server with one or more client devices providing input event data thereto for processing in accordance with the invention. In accordance with the methodologies described herein, the pattern mining system 200 discovers meta-patterns from the input event data sequences. The meta-patterns may then be used to provide information to an analyst with regard to the underlying application-specific system that generated the event data.

As shown in FIG. 2, the computer system may be implemented in accordance with a processor 210, a memory 220 and I/O devices 230. It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices. The term "memory" as used herein is intended to include memory associated with a processor or CPU, such as, for example, RAM, ROM, a fixed memory device (e.g., hard drive), a removable memory device (e.g., diskette), flash memory, etc. In addition, the term "input/output devices" or "I/O devices" as used herein is intended to include, for example, one or more input devices, e.g., keyboard, mouse, etc., for entering data (e.g., event sequences) to the processing unit, and/or one or more output devices, e.g., CRT display, printer, etc., for presenting results (e.g., meta-patterns) associated with the processing unit. The I/O devices may also include one or more network interface devices (e.g., modem) for receiving input event data transmitted over a network from a source and for transmitting pattern mining results over the network back to the source or some other destination. Accordingly, software components including instructions or code for performing the methodologies of the invention, as described herein, may be stored in one or more of the associated memory devices (e.g., ROM, fixed or removable memory) and, when ready to be utilized, loaded in part or in whole (e.g., into RAM) and executed by a CPU.

Figure 3:
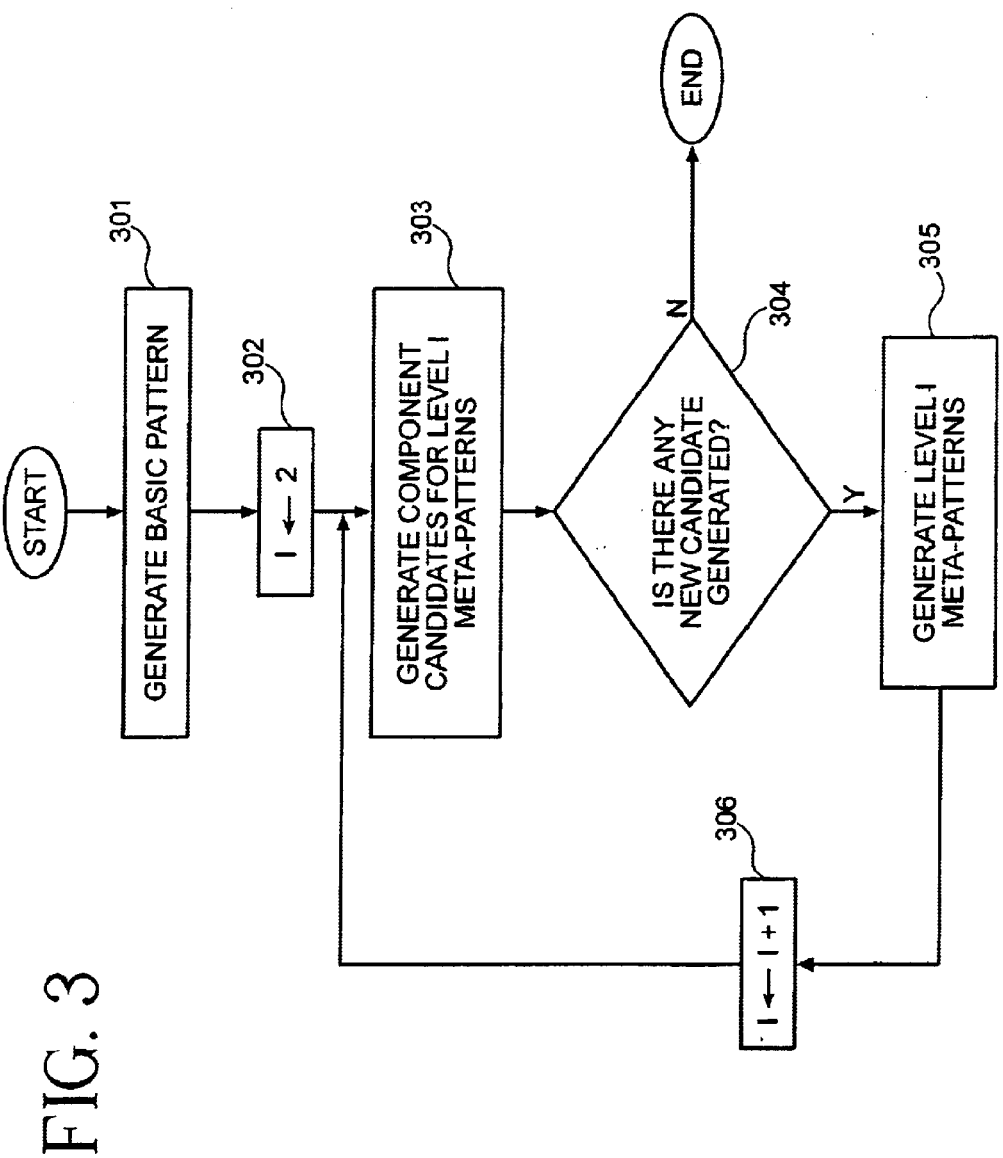
FIG. 3 is a flow diagram illustrating an overall process of mining meta-patterns in a symbol sequence according to an embodiment of the present invention.

Referring now to FIG. 3, a flow diagram illustrates an overall process of mining meta-patterns in a symbol sequence according to an embodiment of the present invention. First, all basic patterns are generated in block 301. A basic pattern is a pattern that only contains symbol as its components. While this step may be accomplished in a variety of conventional ways, it is preferred that it be performed in accordance with the approach described in the U.S. patent application identified by Ser. No. 09/585,757, filed on Jun. 2, 2000, and entitled "Methods for Identifying Partial Periodic Patterns and Corresponding Event Subsequences in an Event Sequence," the disclosure of which is incorporated by reference herein. In the above-referenced patent application, two parameters are employed to qualify valid patterns and the event subsequence containing it, where this subsequence in turn can be viewed as a list of valid segments of perfect repetitions interleaved by disturbance. Each valid segment is required to be of at least a predetermined number of contiguous repetitions of the pattern and the length of each piece of disturbance is allowed only up to a predetermined distance. A method is devised to find valid patterns and, for each of them, the corresponding longest valid subsequence is also discovered.

Returning to FIG. 3, before a loop is entered, the meta-pattern level l is initialized to 2 in block 302. The basic patterns are said to be of level 1. In general, the level of a meta-pattern is defined as the highest level of any of its components plus 1. The process enters a loop. The loop begins with a function block 303 which generates component candidates for level l meta-patterns based on previously discovered level (l−1) meta-patterns. A decision is made in block 304 to determine whether there is any component candidate generated. If so, these component candidates are used to derive level l meta-patterns in block 305. The meta-pattern level l is then incremented in block 306 before the process loops back to block 303. If no new component candidate is generated, the entire process terminates.

Figure 4:
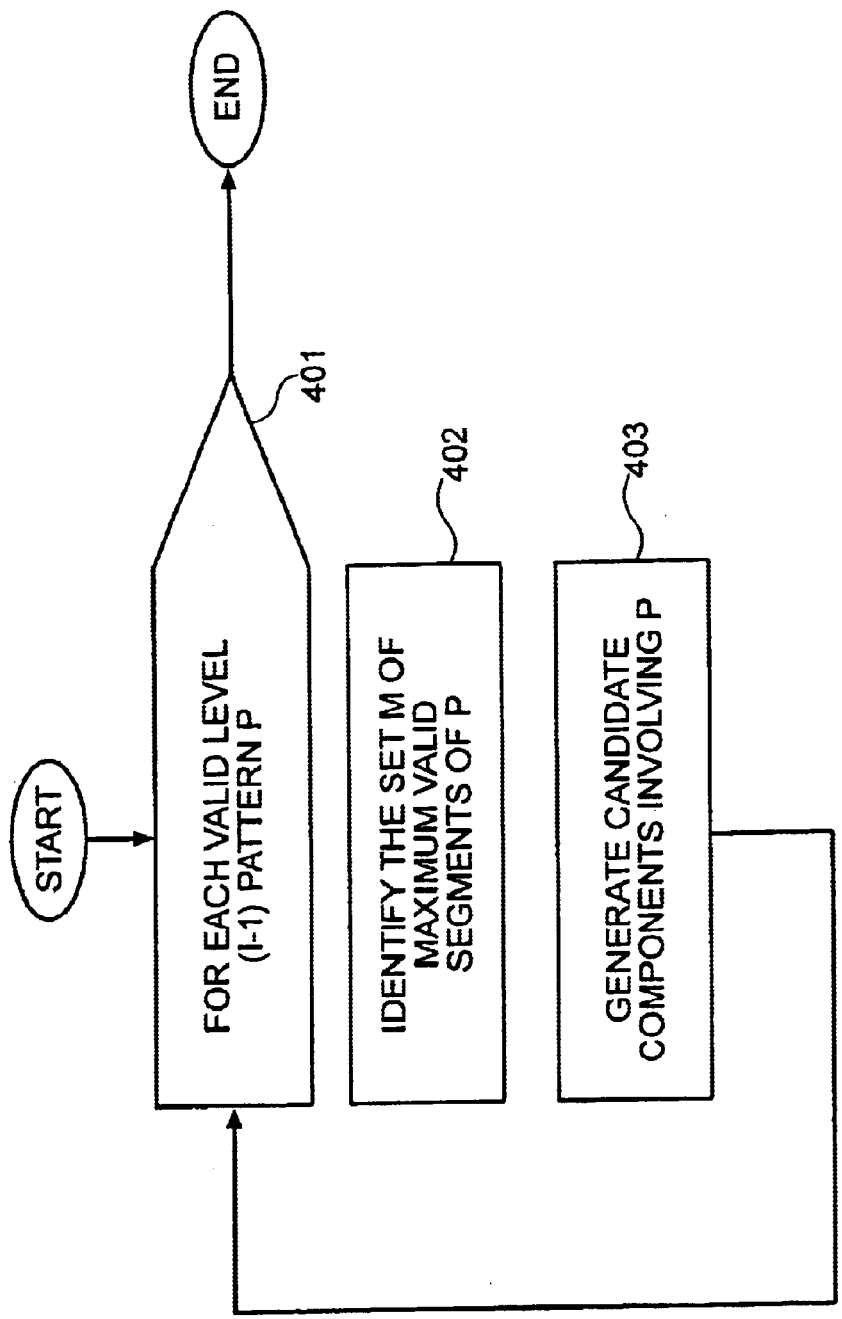
FIG. 4 is a flow diagram illustrating a process to generate candidate components for level 1 meta-patterns according to an embodiment of the present invention.

Referring now to FIG. 4, a flow diagram illustrates a process to generate candidate components for level l meta-patterns according to an embodiment of the present invention. Specifically, FIG. 4 illustrates the process of generating component candidates for level l meta-patterns, as shown in block 303 of FIG. 3. The process contains a loop in block 401 where for each valid level (l−1) pattern P, the set M of maximum valid segments of P is identified in block 402. A "segment" of a pattern P is a contiguous portion of perfect repetitions of P; and it is referred to as a "valid segment" if the number of repetitions of P is at least a user-specified threshold min_rep. A segment G is said to be a "subsegment" of another segment H if G's starting position in the symbol sequence is not earlier than that of H and G's ending position is not later than that of H. A valid segment is called a "maximum valid segment" if it is not a subsegment of any other valid segment. The candidate components that involve P are then derived from M in block 403.

Figure 5:
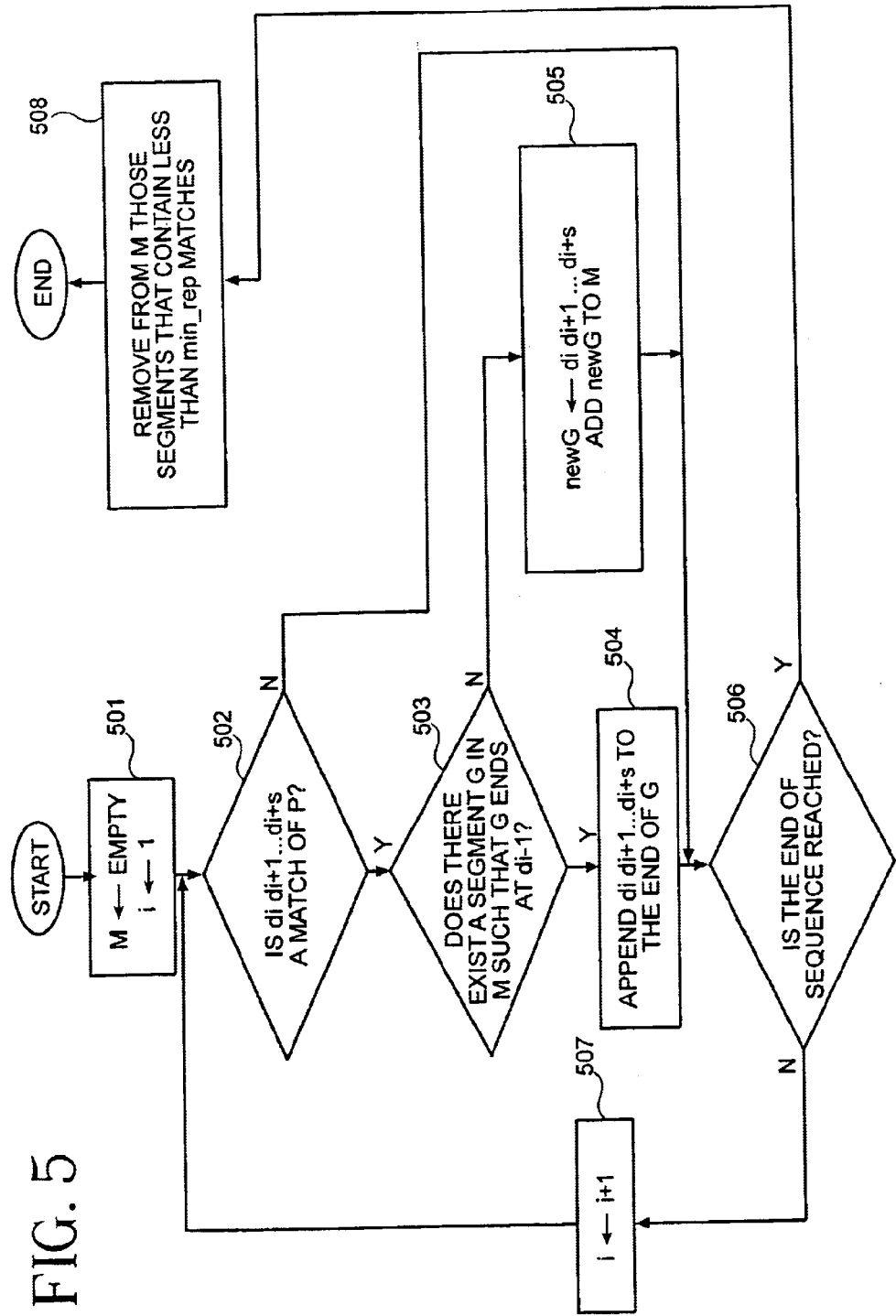
FIG. 5 is a flow diagram illustrating a process to identify a set of maximum valid segments for a given level (l−1) pattern according to an embodiment of the present invention.

Referring now to FIG. 5, a flow diagram illustrates a process to identify a set of maximum valid segments for a given level (l−1) pattern according to an embodiment of the present invention. Specifically, FIG. 5 depicts the process of identifying the set (denoted by M) of maximum valid segments of a given pattern P in a sequence of symbol $d_1, d_2, \ldots d_i \ldots$, as shown in block 402 of FIG. 4. First, M is initialized to be empty and the current position i in the symbol sequence is set to be 1 in block 501. Assume that the pattern P is of span s. The "span" of a pattern is the summation of the lengths of all of its components. A decision is made in block 502 to determine whether the portion $d_i d_{i+1} \ldots d_{i+s}$ corresponds to an occurrence of P. If so, another decision is made in block 503 to determine whether there exists a segment G in M such that G ends at position (i−1). If so, G is extended to the portion $d_i d_{i+1} \ldots d_{i+s}$ in block 504. G now ends at position i+s. Otherwise, a new segment newG is constructed and added to M in block 505. In the case that does not support P, the process goes directly to the decision block 506 where a test is performed to determine whether the end of the symbol sequence is reached. If not, the current position i is incremented in block 507 before the process loops back to block 502. Otherwise, the segments in M are examined sequentially to remove those segments that contains less than min_rep repetitions of P (i.e., segments that are not valid with respect to a prespecified min_rep parameter) in block 508.

Figure 6:
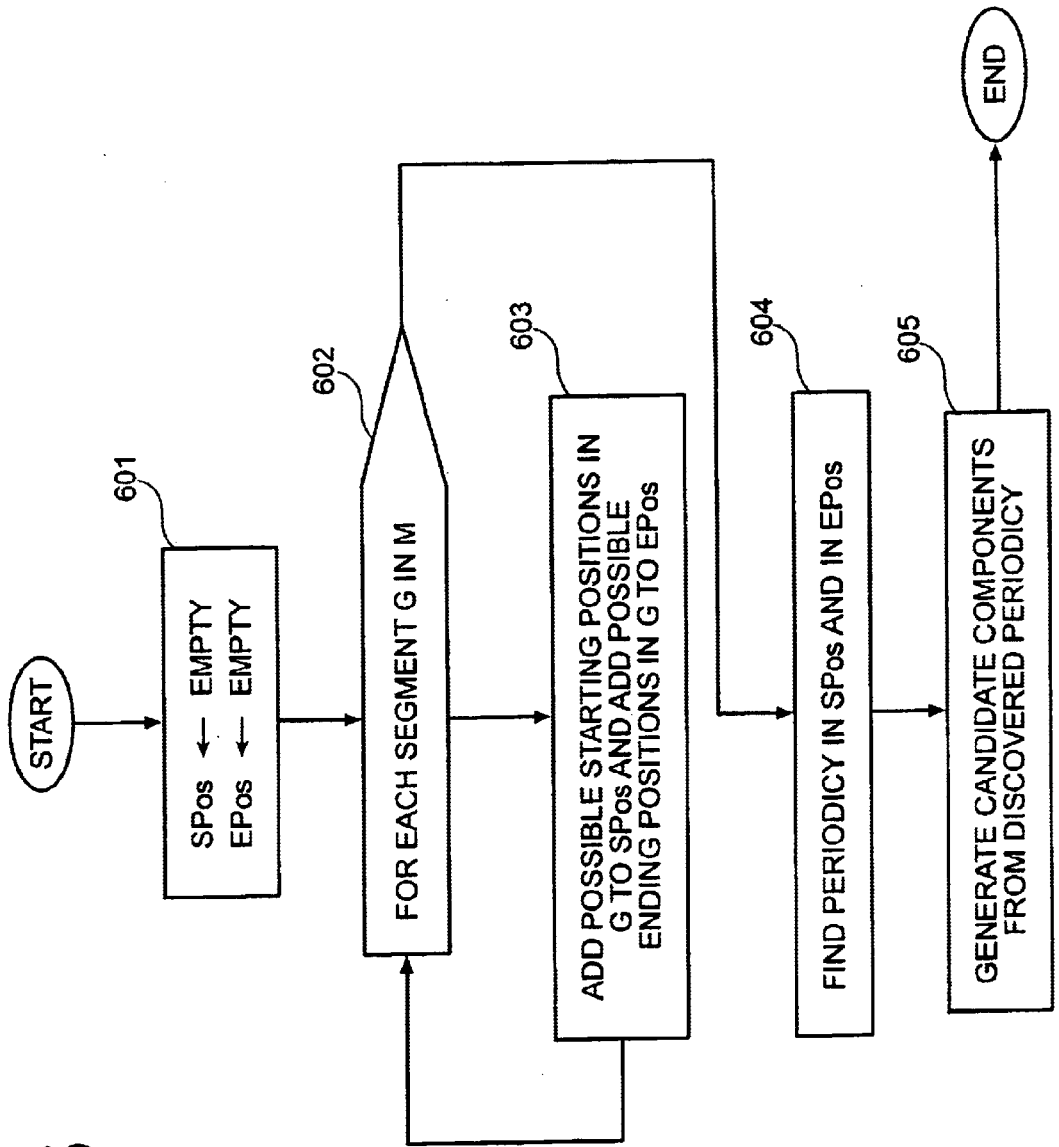
FIG. 6 is a flow diagram illustrating a process to generate candidate components (for level 1 meta-patterns) which involve a given level (l−1) pattern according to an embodiment of the present invention.

Referring now to FIG. 6, a flow diagram illustrates a process to generate candidate components (for level l meta-patterns) which involve a given level (l−1) pattern according to an embodiment of the present invention. Specifically, FIG. 6 depicts the process of generating candidate components involving P from the set of maximum valid segment of P, as shown in block 403 of FIG. 4. In accordance with the present invention, a "component property" is utilized in this step, which can be stated as follows: "a meta-pattern P may serve as a component of some higher level meta-pattern of span k only if the locations of valid subsequences of P exhibit some cyclic behavior with period k." A "valid subsequence" of a pattern P comprises a list of valid segments where the distance between any two adjacent valid segments is at most a user-specified threshold max_dis. Therefore, we start with discovering potential periodic behavior exhibited in the starting positions and ending positions of valid subsequences of P. The set SPos and EPos are used to hold the set of starting positions and ending positions of valid subsequences of P, respectively. Both SPos and EPos are initialized to be empty in block 601. The process then enters a loop in block 602, where for each segment G in the set M of maximum valid segments of P, the set of possible starting positions and ending positions of all valid subsegments of G are added to SPos and EPos, respectively, in block 603. Note that, by definition, the set of starting positions of valid segments is the same as the set of starting positions of valid subsequences, as is also the case with the ending positions. After exiting from this loop, the process enters a function block 604 to find any potential periodicies exhibiting in SPos and EPos. Then, the candidate components are generated from the discovered periodicies in block 605.

Figure 7:
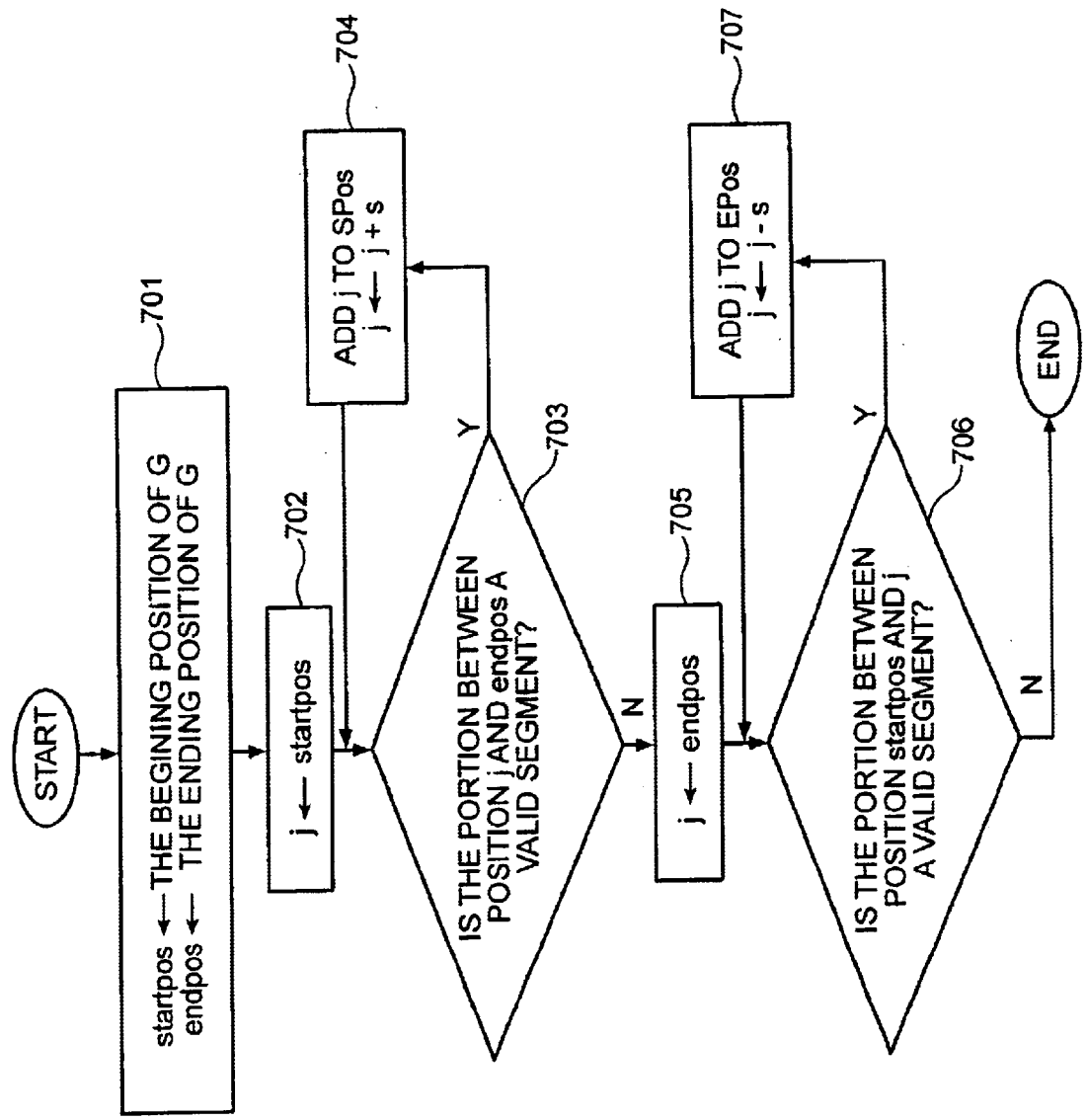
FIG. 7 is a flow diagram illustrating a process to compute a set of possible starting positions and ending positions of valid subsegments of a given valid segment for a given pattern whose span is s according to an embodiment of the present invention.

Referring now to FIG. 7, a flow diagram illustrates a process to compute a set of possible starting positions and ending positions of valid subsegments of a given valid segment for a given pattern whose span is s according to an embodiment of the present invention. Specifically, FIG. 7 depicts the process of adding possible starting positions and ending positions of any valid subsegments of a given valid segment G to SPos and EPos, respectively, as shown in block 603 of FIG. 6. The variables startpos and endpos are assigned to be the starting position and ending position of G, respectively, in block 701. The position index j is first initialized to be the starting position startpos in block 702. The process then enters a loop beginning from a decision block 703 where a decision is made to determine whether the subsegment between position j and position endpos is a valid segment of P. If so, j is first added to SPos and is then incremented by s in block 704 before the process loops back to block 703. Note that s is the span of P. Otherwise, the process continue to examine the ending positions. In block 705, the position index j is set to be the ending position endpos. The process then enters a loop beginning from a decision block 706 where a decision is made to determine whether the subsegment between position startpos and j is a valid segment. If so, j is added to EPos and then decremented by s in block 707 before the process loops back to block 706. Otherwise, the process terminates.

Figure 8:
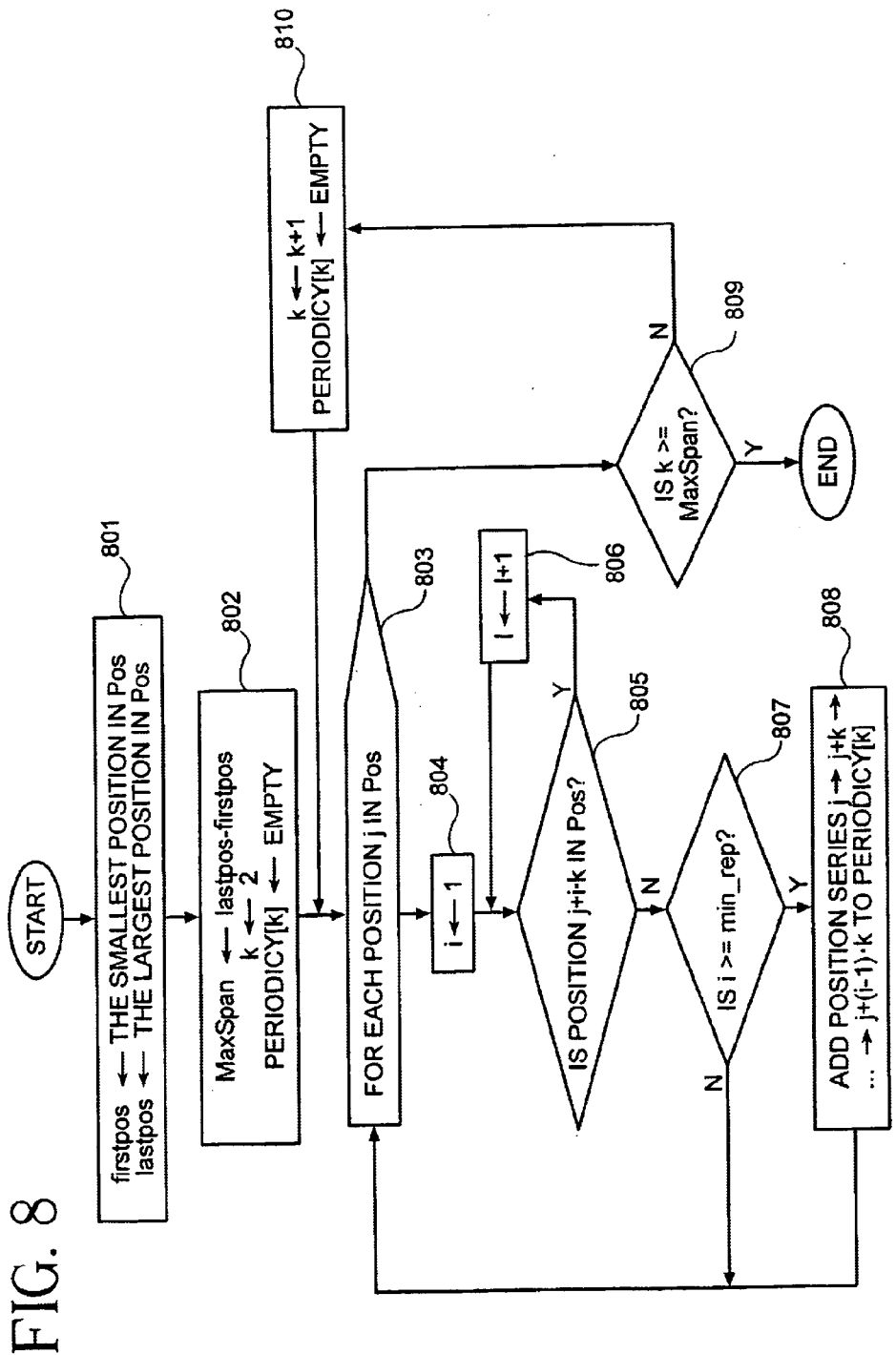
FIG. 8 is a flow diagram illustrating a process to discover potential periodicies exhibiting in a set of positions according to an embodiment of the present invention.

Referring now to FIG. 8, a flow diagram illustrates a process to discover potential periodicies exhibiting in a set of positions according to an embodiment of the present invention. Specifically, FIG. 8 depicts the process of finding periodicy in a set of positions (denoted by Pos), as used in block 604 of FIG. 6. This process is performed on both the set of starting positions SPos and the set of ending positions EPos to detect potential periodicies. Two variables firstpos and lastpos are used to store the smallest position and largest position in Pos, respectively, in block 801. MaxSpan is used to store the difference between firstpos and lastpos in block 802. Moreover, an index k is initialized to be 2 and Periodicy [k] is used to store the set of positions that exhibits cyclic behavior of period k. The process then enters a double loop. The outer loop begins in block 803, where for each position j in Pos, an index i is initialized to be 1 in block 804 before the process enters the inner loop that starts from a decision block 805 to determine whether the position j+i·k is in Pos, where * denotes a multiplication operator. If so, the index i is incremented in block 806 before the process loops back to block 805. Otherwise, the process enters another decision block to determine whether i is greater than or equal to min__rep. If so, the position series j->j+k-> . . . j+(i−1)·k is added to Periodicy[k]. After exiting from the outer loop, a decision is made to determine whether k reaches MaxSpan. If not, k is incremented and the process goes back to block 803 to repeat the procedure for the new value of k. Otherwise, the process terminates.

Figure 9:
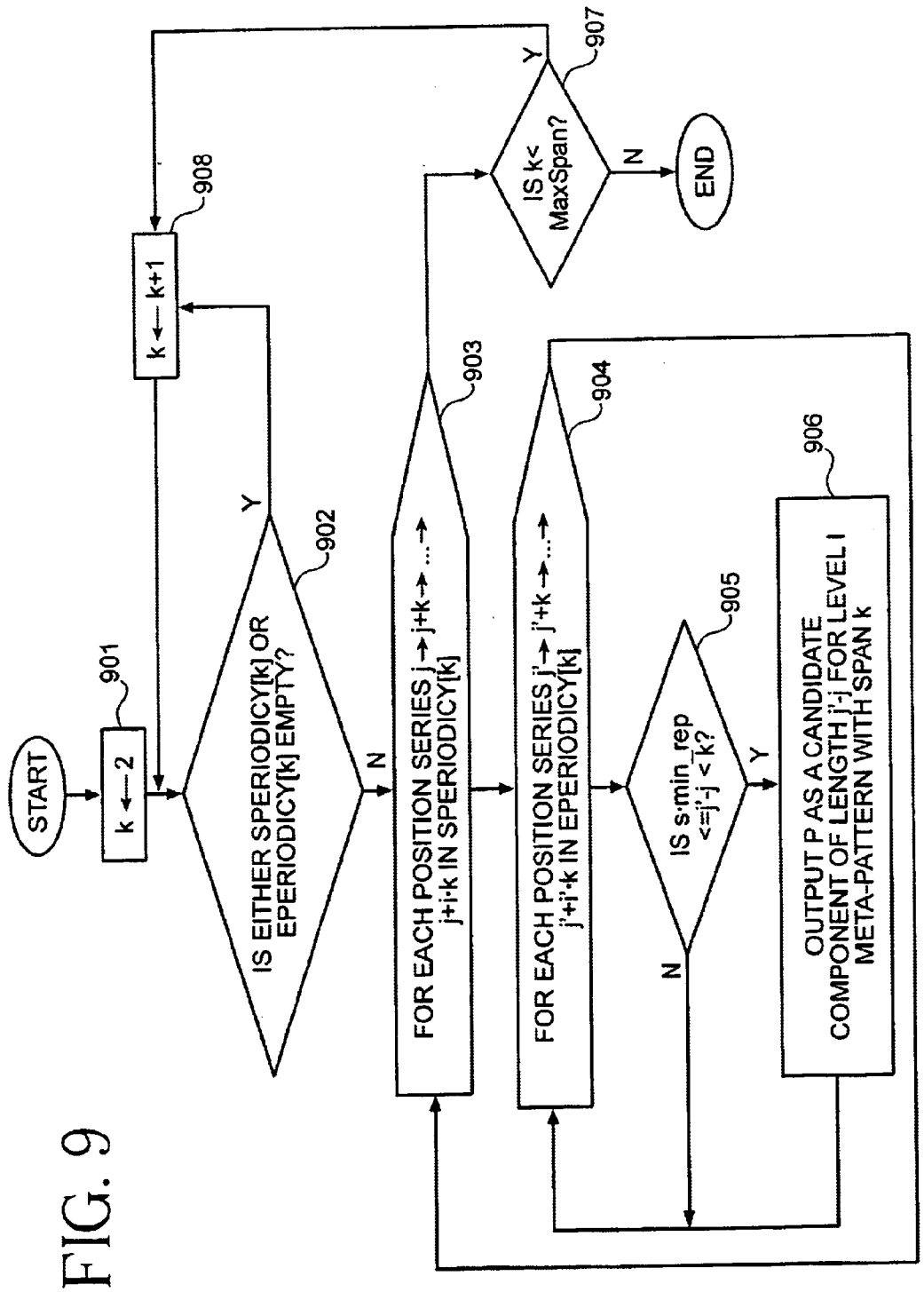
FIG. 9 is a flow diagram illustrating a process to compute candidate components of a given pattern from discovered periodicies in its valid subsequences according to an embodiment of the present invention.

Referring now to FIG. 9, a flow diagram illustrates a process to compute candidate components of a given pattern from discovered periodicies in its valid subsequences according to an embodiment of the present invention. Specifically, FIG. 9 depicts the processing of generating candidate components from discovered periodicy in starting positions and ending positions of valid subsequences of a given pattern P, as shown in block 605 of FIG. 6. SPeriodicy and EPeriodicy hold the periodicy discovered from SPos and EPos, respectively. Initially, an index k is set to be 2 in block 901 before the process enters a loop that begins with a decision block 902 to determine whether either SPeriodicy or EPeriodicy is empty. If so, k is incremented in block 908 and the process loops back to block 902. Otherwise, the process enters a double loop. The outer loop begins in block 903, where for each position series j->j+k-> . . . j+i·k in SPeriodicy[k], the process enters the inner loop in block 904 where each position series j'->j'+k-> . . . j'i'i·k in EPeriodicy [k] is examined sequentially. A decision is made in block 905 to determine whether the distance between j' and j is within the range from s·min__rep to k. If so, the pattern P is output in block 906 as a candidate component for level 1 meta-pattern with span k. The length of such component is j'-j. Note that any component of a meta-pattern, which itself is a pattern (say P) has to have length between s•min__ rep to k. Note that s·min__rep is the minimum length of a valid subsequence of P. This is due to the requirement that any pattern component of a meta-pattern has to be supported by a valid subsequence of the pattern. After exiting from the double loop, the process enters a decision block 907 to determine whether k is still less than the maximum span MaxSpan (calculated in block 802 of FIG. 8). If so, k is incremented and the process goes back to block 902. Otherwise, the process terminates.

Figure 10:
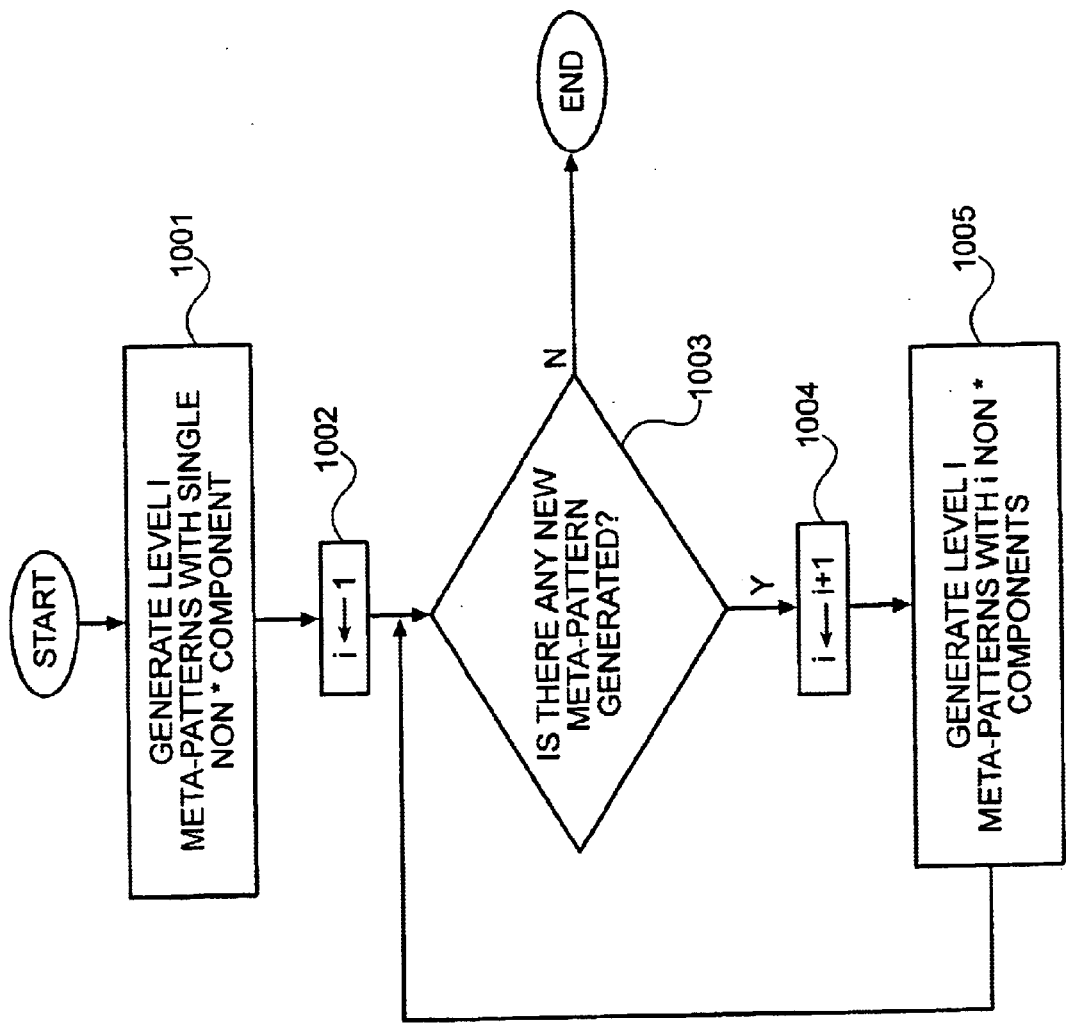
FIG. 10 is a flow diagram illustrating a process to generate level 1 meta-patterns given a set of candidate components according to an embodiment of the present invention.

Referring now to FIG. 10, a flow diagram illustrates a process to generate level 1 meta-patterns given a set of candidate components according to an embodiment of the present invention. Specifically, FIG. 10 depicts the process of generating level 1 meta-patterns from the set of candidate components, as shown in block 305 of FIG. 3. First, all level 1 meta-patterns with a single non * (don't care) component are generated in block 1001. An index i is then set to 1 in block 1002 before the process enters a decision block 1003 to determine whether there is any newly generated level 1 meta-pattern with i non * component(s). If so, i is incremented in block 1004 and all level 1 meta-patterns with i non * components are generated in block 1005. The process then loops back to block 1003. The entire procedure terminates when no level 1 meta-patterns with i non * component are newly generated.

Figure 11:
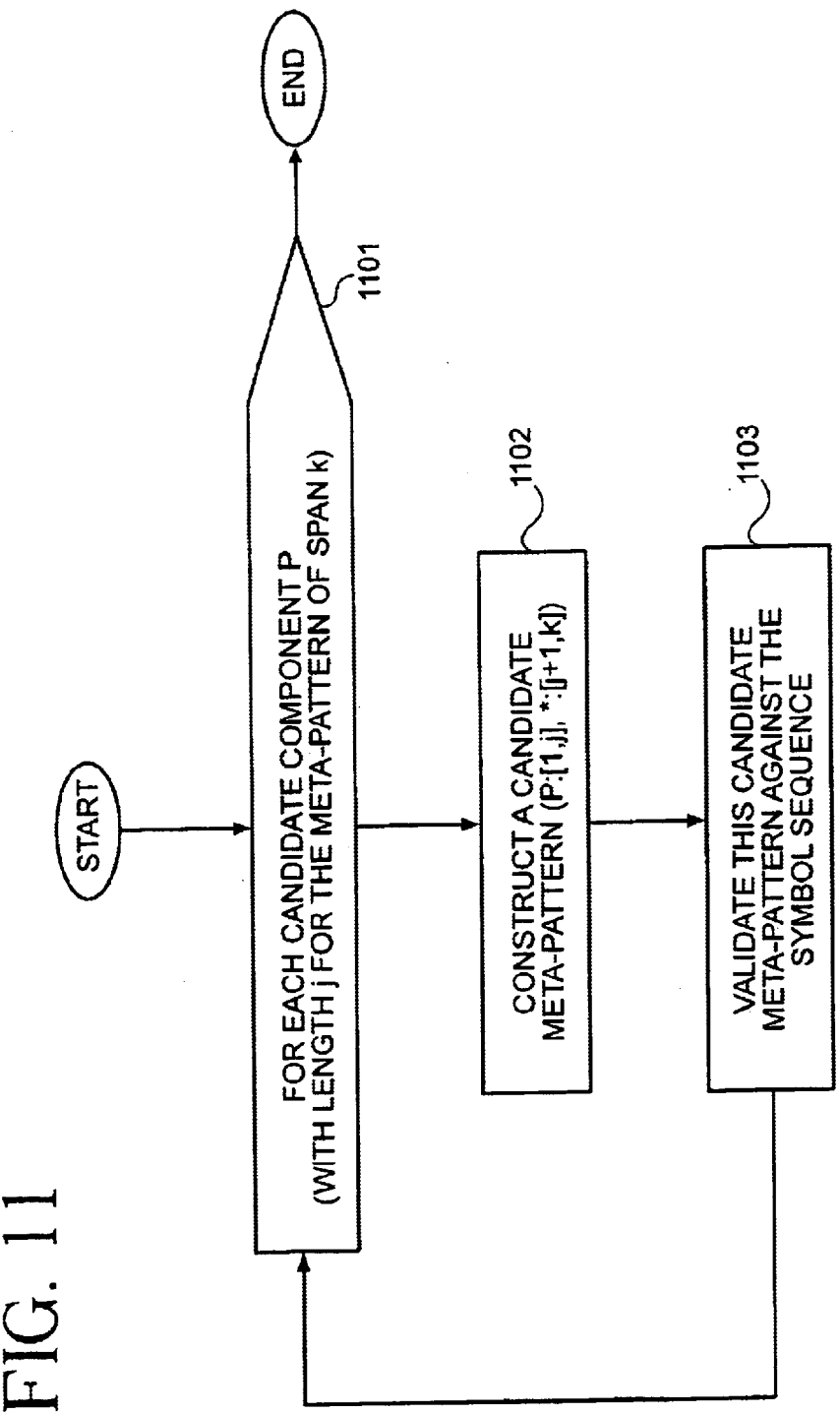
FIG. 11 is a flow diagram illustrating a process to generate level 1 meta-patterns with one non * (don't care) component given a set of candidate components according to an embodiment of the present invention.

Referring now to FIG. 11, a flow diagram illustrates a process to generate level 1 meta-patterns with one non * component given a set of candidate components according to an embodiment of the present invention. Specifically, FIG. 11 depicts the process of generating level 1 meta-patterns with a single non * component, as shown in block 1001 of FIG. 10. The process contains a loop beginning in block 1101, where each candidate component P is examined during each iteration. Assume that the candidate component length is j and the span of the meta-pattern is k. A candidate meta-pattern (P:[1, j], *:[j+1, k]) is constructed in block 1102 and it is validated against the symbol sequence in block 1103 to locate the valid subsequence(s), if any. While validation may occur in a variety of conventional ways, it is preferred that validation be performed in accordance with the approach described in the above-referenced U.S. patent application identified by Ser. No. 09/585,757, filed on Jun. 2, 2000, and entitled "Methods for Identifying Partial Periodic Patterns and Corresponding Event Subsequences in an Event Sequence." In the above-referenced patent application, for a given pattern, all valid segments are first discovered. Next, depending on the distance between any two consecutive valid segments, the longest valid subsequence is discovered.

Figure 12:
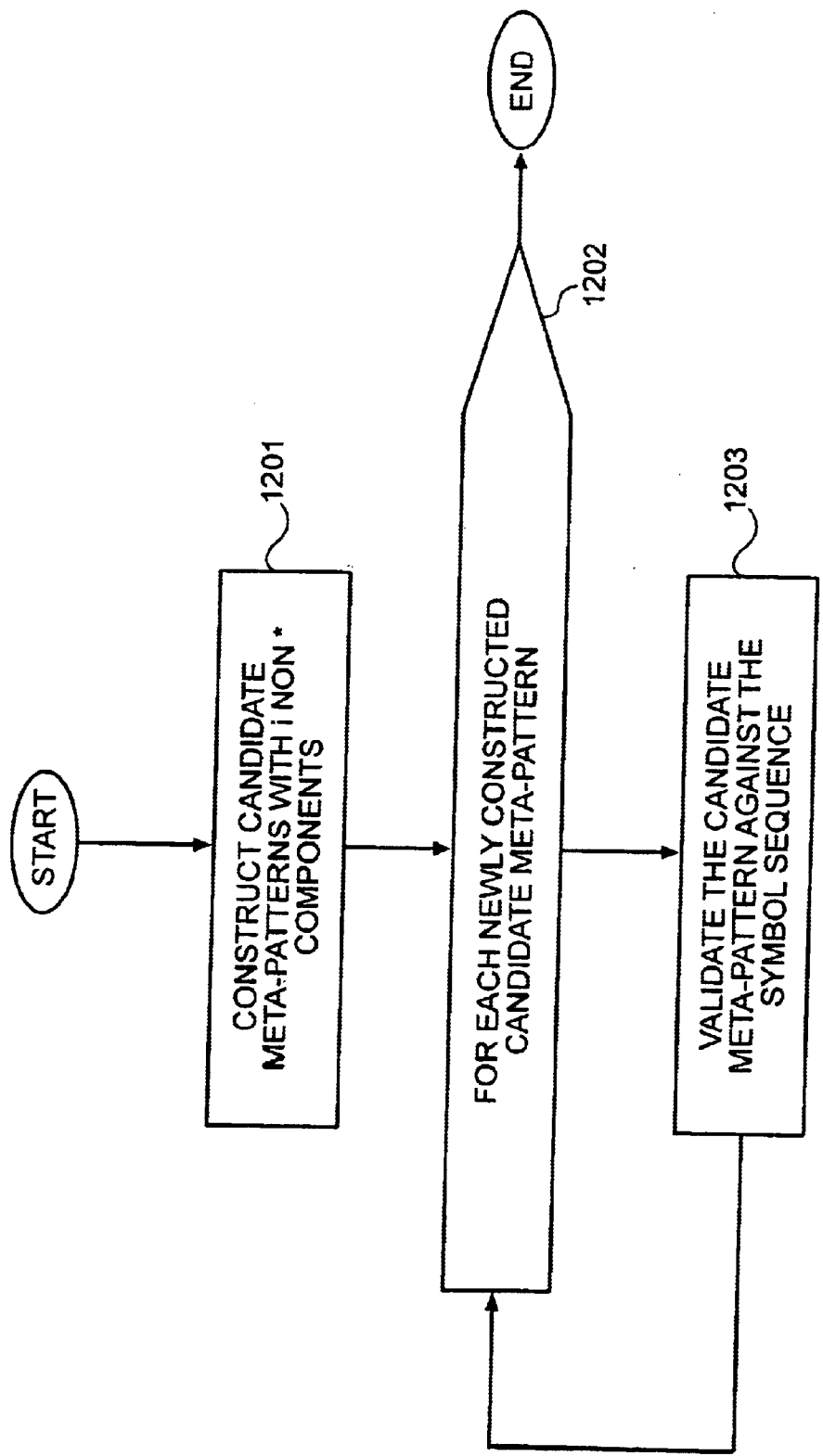
FIG. 12 is a flow diagram illustrating a process to generate level 1 meta-patterns with k non * (don't care) components given a set of qualified level 1 meta-patterns with (k−1) non * (don't care) component(s) according to an embodiment of the present invention.

Referring now to FIG. 12, a flow diagram illustrates a process to generate level 1 meta-patterns with k non * components given a set of qualified level 1 meta-patterns with (k−1) non * component(s) according to an embodiment of the present invention. Specifically, FIG. 12 depicts the process of generating level 1 meta-patterns of span k with i non * components based on the set of valid level 1 meta-patterns of the same span with (i−1) non * component(s), as shown in block 1005 of FIG. 10. First, candidate meta-patterns with i non * components are constructed in block 1201. This step can be carried out by utilizing the "a priori property" that is stated as follows: "the pattern ($P_1$:[1, $t_1$], $P_2$:[$t_1$+1, $t_2$], ..., $P_i$:[$t_{i-1}$+1, k]) may be valid only if all of (*:[1,$t_1$], $P_2$:[$t_1$+1, $t_2$], ..., $P_i$:[$t_{i-1}$+1, k]), ($P_1$:[1, $t_1$], *:[$t_1$+1, $t_2$], ..., $P_i$:[$t_{i-1}$+1, k]), ..., and ($P_1$:[1, $t_1$], $P_2$:[$t_1$+1, $t_2$], ..., *:[$t_{i-1}$+1, k]) are valid meta-patterns (with (i−1) non * components)." After all candidate meta-patterns are constructed, the process then enters a loop in block 1202, where for each candidate meta-pattern, the validation procedure described above and in the above-referenced U.S. patent application identified by Ser. No. 09/585,757 is performed to discover the valid subsequence(s) in block 1203.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method of processing a sequence of symbols, the method comprising the steps of:
   obtaining the sequence of symbols; and
   identifying at least one meta-pattern in the sequence of symbols, the at least one meta-pattern being configured as a list of components, wherein each component of the at least one meta-pattern can be one of a symbol appearing in the sequence, a don't care symbol, and another previously discovered pattern.

2. The method of claim 1, wherein the sequence of symbols comprises time series data.

3. The method of claim 1, wherein the sequence of symbols comprises event data.

4. A method of mining meta-patterns in a sequence of symbols, the method comprising the steps of:
   obtaining the sequence of symbols; and
   identifying at least one meta-pattern and corresponding subsequences of the at least one meta-pattern, wherein the subsequence is a list of segments of contiguous repetitions of the meta-pattern and wherein the number of repetitions in each segment is not less than a predefined threshold and a distance between any two adjacent segments is not greater than a predefined threshold.

5. The method of claim 4, wherein the identifying step further comprises an iterative process, wherein during the lth iteration, all meta-patterns of level l are mined.

6. The method of claim 5, wherein mining patterns of level l, l being greater than one, comprises the steps of:
   generating candidate components from discovered level (l−1) patterns; and
   generating level l meta-patterns.

7. The method of claim 6, wherein the step of generating candidate components from level (l−1) meta-patterns comprises an iterative process, wherein each level (l−1) meta-pattern is examined sequentially.

8. The method of claim 7, wherein examining a given level (l−1) meta-pattern comprises the steps of:
   identifying a set of maximum valid segments of the level (l−1) meta-pattern; and
   generating candidate components involving the level (l−1) meta-pattern.

9. The method of claim 8, wherein the step of identifying the set of maximum valid segments of a given meta-pattern further comprises the steps of:
   identifying occurrences of the meta-pattern in the symbol sequence; and
   generating the set of maximum valid segments of the meta-pattern.

10. The method of claim 9, wherein the step of identifying occurrences of a given meta-pattern in the symbol sequence uses a sliding window of width equal to a span of the meta-pattern.

11. The method of claim 8, wherein the step of generating candidate components involving a given meta-pattern further comprises the steps of:
   discovering periodicy exhibited by the valid subsequences of the meta-pattern; and
   generating candidate components involving the meta-pattern from the discovered periodicy preserved by valid subsequences of the meta-pattern.

12. The method of claim 11, wherein the step of discovering periodicy exhibited by the valid subsequences of a given meta-pattern further comprises the steps of:
   collecting sets of possible starting positions and ending positions of valid subsequences of the meta-pattern; and
   finding periodicy preserved by these starting positions and ending positions.

13. The method of claim 6, wherein the step of generating level/meta-patterns from the set of candidate components further comprises an iterative process, wherein during the kth iteration, the set of level l meta-patterns with at least one k non-don't care component are mined.

14. The method claim 13, wherein the step of generating level l meta-patterns with at least one k non-don't care component further comprises of the steps of:
   constructing candidate level l meta-patterns with at least one k non-don't care component; and
   validating candidate meta-patterns against the symbol sequence.

15. The method of claim 14, wherein the step of constructing candidate level l meta-patterns with at least one k non-don't care component utilizes a component-based property when k is equal to one.

16. The method of claim 15, wherein the component-based property is that a meta-pattern P may serve as a component of some higher level meta-pattern of span k only if the locations of valid subsequences of P exhibit some cyclic behavior with period k.

17. The method of claim 14, wherein the step of constructing candidate level l meta-patterns with at least one k non-don't care component utilizes an a priori property when k is greater than one.

18. The method of claim 4, wherein the sequence of symbols comprises time series data.

19. The method of claim 4, wherein the sequence of symbols comprises event data.

20. Apparatus for processing a sequence of symbols, the apparatus comprising:
   at least one processor operative to: (i) obtain the sequence of symbols; and (ii) identify at least one meta-pattern in the sequence of symbols, the at least one meta-pattern being configured as a list of components, wherein each component of the at least one meta-pattern can be one of a symbol appearing in the sequence, a don't care symbol, and another previously discovered pattern.

21. The apparatus of claim 20, wherein the sequence of symbols comprises time series data.

22. The apparatus of claim 20, wherein the sequence of symbols comprises event data.

23. Apparatus for mining meta-patterns in a sequence of symbols, the apparatus comprising:

at least one processor operative to: (i) obtain the sequence of symbols; and (ii) identify at least one meta-pattern and corresponding subsequences of the at least one meta-pattern, wherein the subsequence is a list of segments of contiguous repetitions of the meta-pattern and wherein the number of repetitions in each segment is not less than a predefined threshold and a distance between any two adjacent segments is not greater than a predefined threshold.

24. The apparatus of claim 23, wherein the identifying operation further comprises an iterative process, wherein during the lth iteration, all meta-patterns of level l are mined.

25. The apparatus of claim 24, wherein mining patterns of level l, l being greater than one, comprises: (i) generating candidate components from discovered level (l-1) patterns; and (ii) generating level l meta-patterns.

26. The apparatus of claim 25, wherein the operation of generating candidate components from level (l-1) meta-patterns comprises an iterative process, wherein each level (l-1) meta-pattern is examined sequentially.

27. The apparatus of claim 26, wherein examining a given level (l-1) meta-pattern comprises: (i) identifying a set of maximum valid segments of the level (l-1) meta-pattern; and (ii) generating candidate components involving the level (l-1) meta-pattern.

28. The apparatus of claim 27, wherein the operation of identifying the set of maximum valid segments of a given meta-pattern further comprises: (i) identifying occurrences of the meta-pattern in the symbol sequence; and (ii) generating the set of maximum valid segments of the meta-pattern.

29. The apparatus of claim 28, wherein the operation of identifying occurrences of a given meta-pattern in the symbol sequence uses a sliding window of width equal to a span of the meta-pattern.

30. The apparatus of claim 27, wherein the operation of generating candidate components involving a given meta-pattern further comprises: (i) discovering periodicy exhibited by the valid subsequences of the meta-pattern; and (ii) generating candidate components involving the meta-pattern from the discovered periodicy preserved by valid subsequences of the meta-pattern.

31. The apparatus of claim 30, wherein the operation of discovering periodicy exhibited by the valid subsequences of a given meta-pattern further comprises: (i) collecting sets of possible starting positions and ending positions of valid subsequences of the meta-pattern; and (ii) finding periodicy preserved by these starting positions and ending positions.

32. The apparatus of claim 25, wherein the operation of generating level l meta-patterns from the set of candidate components further comprises an iterative process, wherein during the kth iteration, the set of level l meta-patterns with at least one k non-don't care component are mined.

33. The apparatus of claim 32, wherein the operation of generating level/meta-patterns with at least one k non-don't care component further comprises: (i) constructing candidate level l meta-patterns with at least one k non-don't care component; and (ii) validating candidate meta-patterns against the symbol sequence.

34. The apparatus of claim 33, wherein the operation of constructing candidate level l meta-patterns with at least one k non-don't care component utilizes a component-based property when k is equal to one.

35. The apparatus of claim 34, wherein the component-based property is that a meta-pattern P may serve as a component of some higher level meta-pattern of span k only if the locations of valid subsequences of P exhibit some cyclic behavior with period k.

36. The apparatus of claim 33, wherein the operation of constructing candidate level l meta-patterns with at least one knon-don't care component utilizes an a priori property when k is greater than one.

37. The apparatus of claim 23, wherein the sequence of symbols comprises time series data.

38. The apparatus of claim 23, wherein the sequence of symbols comprises event data.

39. An article of manufacture for processing a sequence of symbols, the article comprising a machine readable medium containing one or more programs which when executed implement the steps of:

obtaining the sequence of symbols; and identifying at least one meta-pattern in the sequence of symbols, the at least one meta-pattern being configured as a list of components, wherein each component of the at least one meta-pattern can be one of a symbol appearing in the sequence, a don't care symbol, and another previously discovered pattern.

40. An article of manufacture for mining meta-patterns in a sequence of symbols, the article comprising a machine readable medium containing one or more programs which when executed implement the steps of:

obtaining the sequence of symbols; and identifying at least one meta-pattern and corresponding subsequences of the at least one meta-pattern, wherein the subsequence is a list of segments of contiguous repetitions of the meta-pattern and wherein the number of repetitions in each segment is not less than a predefined threshold and a distance between any two adjacent segments is not greater than a predefined threshold.

* * * * *